United States Patent
Burger et al.

(10) Patent No.: US 6,315,544 B1
(45) Date of Patent: Nov. 13, 2001

(54) ADJUSTABLE LENGTH EXTENSION BARS FOR CONNECTING A MOLD EJECTOR PLATE TO A PRESS EJECTOR PLATE

(75) Inventors: Philip M. Burger, Olathe, KS (US); Mark A. Brown, Oak Grove, MO (US)

(73) Assignee: Burger Engineering, Inc., Olathe, KS (US)

(*) Notice: Subject to any disclaimer, the term of this patent is extended or adjusted under 35 U.S.C. 154(b) by 0 days.

(21) Appl. No.: 09/414,264

(22) Filed: Oct. 7, 1999

(51) Int. Cl.[7] .................. B29C 41/34; B29C 43/32; B29C 45/40
(52) U.S. Cl. ............ 425/151; 403/300; 425/185; 425/195 R; 425/444; 425/554
(58) Field of Search ................... 403/300, 301, 403/302, 306, 307; 425/554, 556, 444, 182, 185, 190, 192 R, 151, 153; 249/68

(56) References Cited

U.S. PATENT DOCUMENTS

| | | | |
|---|---|---|---|
| 2,680,636 | * 6/1954 | Griffin | 403/301 |
| 3,091,749 | * 5/1963 | Felts | 439/369 |
| 3,448,488 | 6/1969 | Kiraly | 425/192 R |
| 4,865,536 | 9/1989 | Inaba et al. | 425/556 |
| 4,891,002 | 1/1990 | Inaba et al. | 425/556 |
| 5,252,057 | 10/1993 | Landstorfer | 425/556 |
| 5,256,364 | 10/1993 | Herbst | 264/334 |
| 5,439,368 | 8/1995 | Martin | 425/190 |
| 6,179,606 | * 1/2001 | Muller | 425/556 |

* cited by examiner

Primary Examiner—Nam Nguyen
Assistant Examiner—Emmanuel Luk
(74) Attorney, Agent, or Firm—Shughart Thomson & Kilroy P.C.

(57) ABSTRACT

A length adjustable extension bar for connecting a mold ejector plate to a press ejector plate comprises a rotatable member threadingly secured on one end of a threaded stud. An opposite end of the threaded stud is connected to the press ejector plate and a distal end or head of the rotatable member is connected to the mold ejector plate. Rotation of the rotatable member relative to the threaded stud increases or decreases the overall length of the extension bar. A locking assembly comprising a locking sleeve biased by a spring into engagement with a locking nut is mounted on the extension bar to prevent adjustments in the length of the extension bar without first advancing the locking sleeve out of engagement with the locking nut. The locking sleeve is slidably mounted on the rotatable member shaft but is prevented from rotating relative to the shaft by a pin extending through the rotatable member shaft and aligned slots formed on opposite sides of the locking sleeve. The spring is positioned on the rotatable member shaft between the rotatable member head and the sleeve to bias the sleeve toward and into engagement with the locking nut.

10 Claims, 3 Drawing Sheets

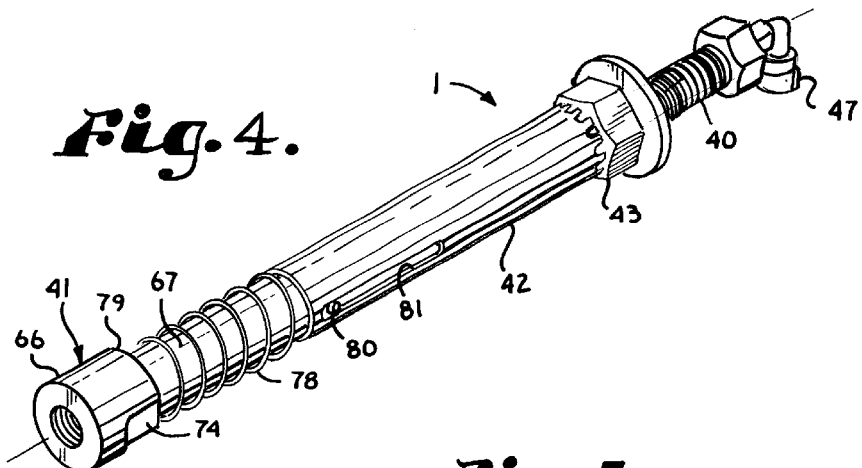
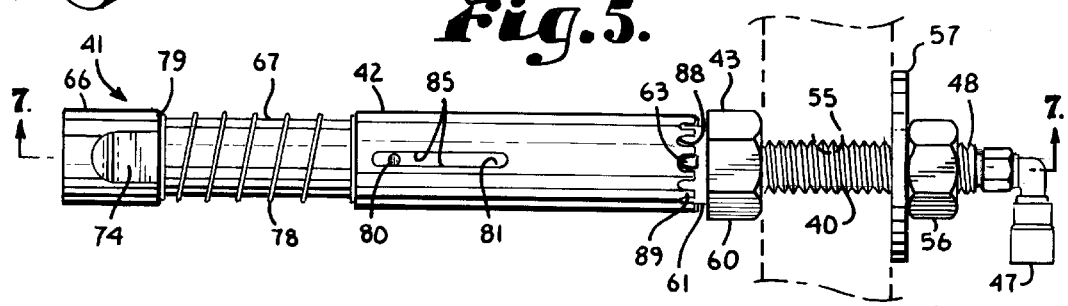
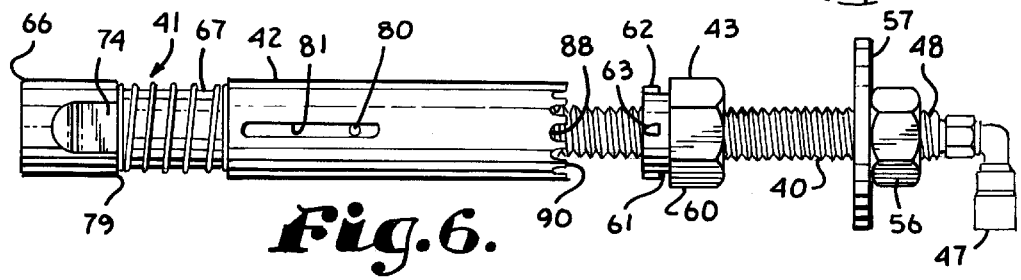
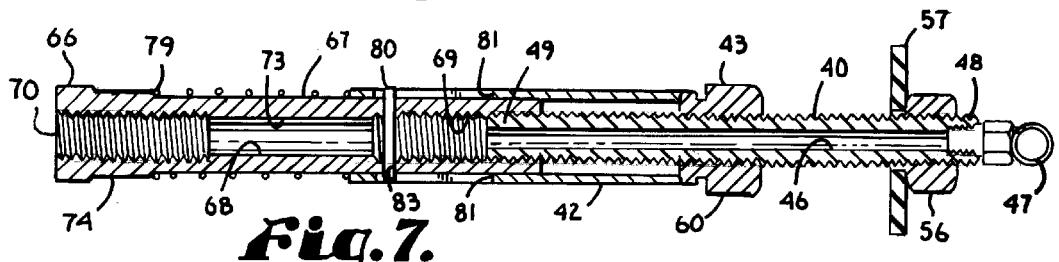

ADJUSTABLE LENGTH EXTENSION BARS FOR CONNECTING A MOLD EJECTOR PLATE TO A PRESS EJECTOR PLATE

BACKGROUND OF THE INVENTION

The present invention relates to extension bars for connecting a mold ejector plate to a press ejector plate in an injection molding apparatus and in particular to extension bars which are adjustable in length.

In a conventional molding apparatus, a molded part is produced by injecting mold material into a cavity formed between a stationary and a movable mold half mounted to a mold press. The stationary mold half is mounted on a front stationary platen of the mold press and the movable mold half is mounted to a movable platen which is generally slidably mounted on tie-rods extending from the front stationary platen to a rear stationary platen of the mold press. The movable platen is hydraulically advanced toward and away from the front stationary platen during a mold cycle to move the movable mold half between a closed and open alignment with the stationary mold half.

Mold material is injected into the mold cavity when the movable mold half is positioned in the closed position relative to the stationary mold half. Once the molded part has set, the movable mold half is separated from the stationary mold half, and the molded part is then ejected from between the two mold halves using an ejector assembly.

A typical ejector assembly comprises a plurality of ejector pins, which are connected to a mold ejector plate slidably mounted relative to the movable mold half. The mold ejector plate is connected to a press ejector plate by extension bars or tie in bars. The ejector pins are slidably mounted within the movable mold half in bores which open into the mold cavity. The ejector pins are advanceable between a retracted position within the bores to an extended position wherein a portion of each ejector pin extends into the mold cavity for ejecting the molded part out of the cavity.

The mold ejector plate is typically mounted within a chamber in the moveable mold half. The mold ejector plate is mounted in the chamber to permit it to slide toward and away from the mold cavity. The extension bars extend through aligned holes in the movable platen and a rear wall of the movable mold half and connect the mold ejector plate to the press ejector plate.

In ejecting the molded part from the mold, the movable platen is first advanced away from the front stationary platen to pull the movable mold half away from the stationary mold half. After the moveable mold half has separated from the stationary mold half and advanced to a fully open position, the press ejector plate is hydraulically advanced forward to advance the mold ejector plate forward relative to the moveable mold half and to advance the ejector pins from a retracted to an extended position thereby ejecting or separating the molded part from the moveable mold half.

The molded part then typically falls from between the stationary and moveable mold halves. The press ejector plate is then retracted hydraulically and the mold halves are advanced to a closed alignment and the cycle is repeated.

The stationary and moveable mold halves are removably securable to the mold press such that different molds may be interchangeably connected to the mold press to permit efficient utilization. In changing out a mold, the moveable mold half must be disconnected from the moveable platen and the extension bars must be disconnected from the mold ejector plate contained within the moveable mold half. The new moveable mold half must then be connected to the moveable platen and the extension bars must then be connected to the mold ejector plate.

The optimum length of the ejection stroke for the ejector pins will vary from mold to mold depending on differences in the size and shape of the part to be molded. In addition, the length of the extension bars may need to be adjusted during the life of the mold to accommodate wear to the mold. In existing systems, mold press operators typically use extension bars specifically machined to the desired length and must continuously machine extension bars to fit different molds and presses.

There remains a need for an extension bar or tie-in bar for connecting a mold ejector plate to a press ejector plate which is readily adjustable in length and adapted to expedite mold changes and set-up.

SUMMARY OF THE INVENTION

The present invention comprises an extension bar for connecting a mold ejector plate to a press ejector plate which is adjustable in length. The extension bar includes a rotatable member which is threadingly secured on one end of a threaded stud. An opposite end of the threaded stud is connected to the press ejector plate. The rotatable member includes a head and a shaft with a threaded bore extending into the shaft into which the threaded stud extends. The head of the rotatable member is connected to the mold ejector plate. Rotation of the rotatable member relative to the threaded stud increases or decreases the overall length of the extension bar.

A locking assembly comprising a locking sleeve biased by a spring into engagement with a locking nut is mounted on the extension bar to prevent adjustments in the length of the extension bar without first advancing the locking sleeve out of engagement with the locking nut. In particular, the locking sleeve is slidably mounted on the rotatable member shaft. A pin extending through the rotatable member shaft and aligned slots formed on opposite sides of the locking sleeve permits axial sliding of the sleeve relative to the rotatable member shaft but prevents the sleeve from rotating relative to the shaft. The spring is positioned on the rotatable member shaft between the rotatable member head and the sleeve to bias the sleeve toward the locking nut.

The locking nut is threadingly secured to the threaded stud between the locking sleeve and the press ejector plate. A plurality of bosses extend radially outward from a nipple formed on an end of the locking nut facing the locking sleeve. A plurality of notches are formed on the end of the locking sleeve facing the locking nut. The notches are sized to receive the bosses on the locking nut when the locking sleeve is biased against the locking nut. The bosses engage fingers on the sleeve extending between the notches to prevent rotation of the locking sleeve relative to the locking nut.

To adjust the length of the extension bar, the sleeve is slid away from the locking nut to advance the bosses on the locking nut out of the notches in the locking sleeve. The locking sleeve may then be rotated relative to the locking nut which causes rotation of the rotatable member relative to the threaded stud to adjust the length of the extension bar. The adjustability of the length of the extension bars facilitates changeouts of the molds connected to the mold press. The same extension bar can be used with different molds and the length of the extension bars can be adjusted to accommodate wear to the mold.

The extension bar is preferably connected to the mold ejector plate using a quick connect coupler assembly comprising a quick connect coupler and a quick connect stud. The quick connect stud is bolted to the mold ejector plate and the quick connect coupler is connected to the rotatable member head. The quick connect coupler is preferably of a type in which the quick connect coupler releases the quick connect stud by supplying pressurized air to the quick connect coupler. In a preferred embodiment, an airflow passageway extends through the extension bar for selectively supplying pressurized air to the quick connect coupler. The preferred quick connect coupler assembly permits the extension bar to be quickly and remotely secured to and disconnected from the mold ejector plate to facilitate changing out of molds from the mold press.

OBJECTS OF THE INVENTION

The objects of this invention include: providing an extension bar for connecting a press ejector plate to a mold ejector plate which is selectively adjustable in length; to provide such an extension bar which is readily connectable to a press ejector plate and a mold ejector plate; to provide such an extension bar adapted for use with a quick connect coupler assembly for connecting the extension bar to the press ejector plate or mold ejector plate; to provide such an extension bar which is adapted for use with a quick connect coupler assembly which utilizes pressurized air to release the quick connect coupler assembly and to provide such an extension bar which is relatively inexpensive to manufacture and particularly well adapted for its intended usage.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a perspective view of an extension bar of the present invention.

FIG. 5 is a front elevational view of the extension bar showing a locking sleeve of the extension bar biased against a locking nut of the extension bar.

FIG. 6 is a view similar to FIG. 5 showing the locking sleeve advanced away from the locking nut.

FIG. 7 is a cross-sectional view taken along line 7—7 of FIG. 5.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Mold Press

Figure 1:
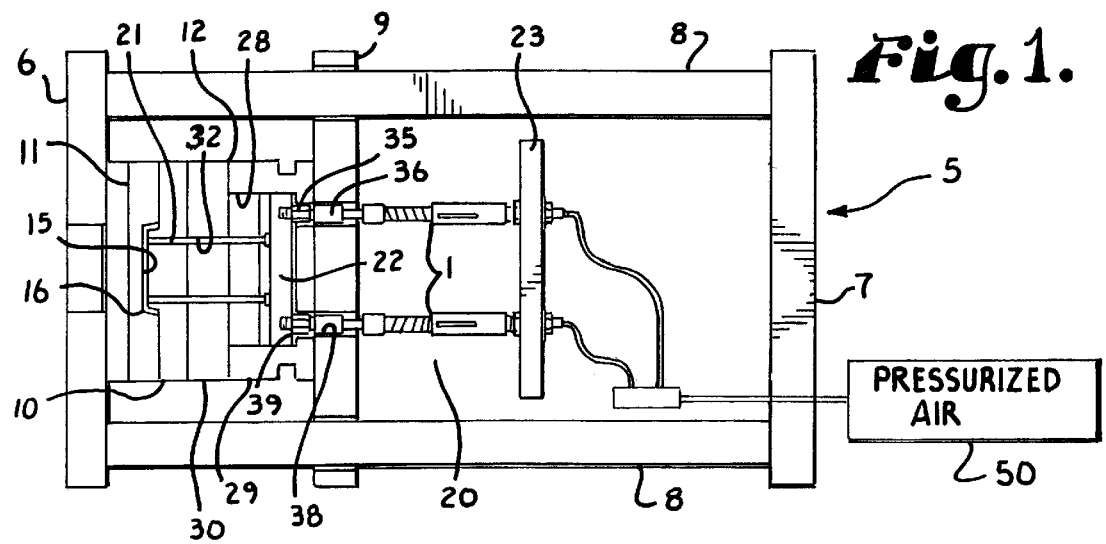
FIG. 1 is a fragmentary and partially schematic elevational view showing a portion of a mold press having a mold secured therein and showing the mold closed and showing an extension bar of the present invention connecting a press ejector plate to a mold ejector plate of the mold press.
Figure 2:
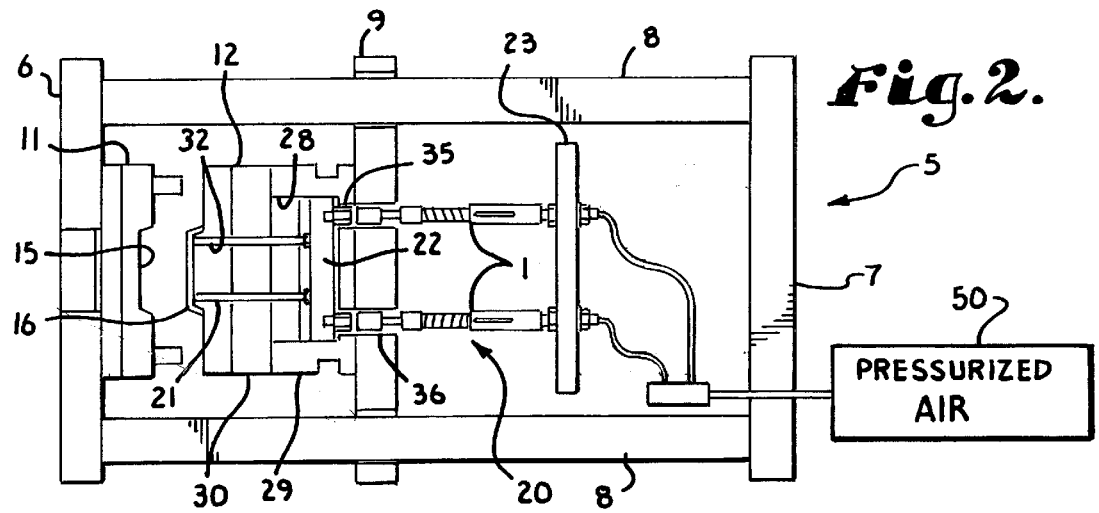
FIG. 2 is a view similar to FIG. 1 showing the mold open.
Figure 3:
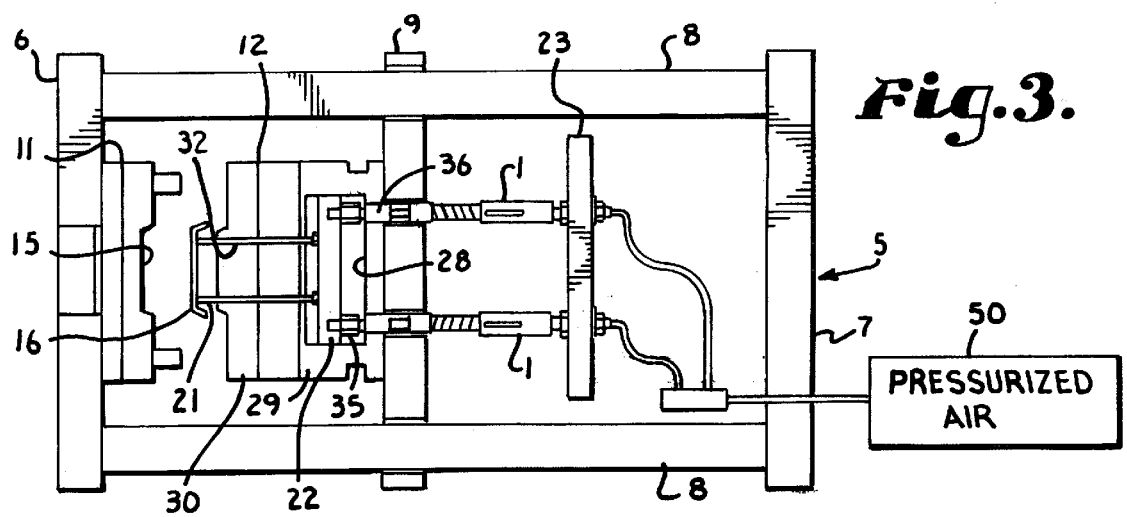
FIG. 3 is a view similar to FIG. 1 showing the mold open and showing an ejector assembly separating a molded part from one of the mold halves.

Referring to the drawings in more detail, FIGS. 1–3 generally show extension bars 1 of the present invention utilized in a mold press 5. A portion of the mold press 5 is shown in FIGS. 1–3 for purposes of explanation and in describing the environment in which the extension bars, in their preferred form, are adapted for use. The mold press includes front and rear stationary platens 6 and 7 connected together by tie-rods 8. A movable platen 9 is slidably mounted on the tie-rods 8 and slidable between the front and rear stationary platens 6 and 7. The movable platen 9 is hydraulically driven by a drive system not shown.

A mold 10 comprising a stationary mold half 11 and a movable mold half 12 is removably mounted to the mold press 5. The stationary mold half 11 is removably mounted to the front stationary platen 6 and the movable mold half 12 is removably mounted to the movable platen 9. A mold cavity 15 is formed at the interface between the stationary and movable mold halves 11 and 12 when the mold halves 11 and 12 are positioned in the closed alignment as shown in FIG. 1. Plastic is injected into the mold cavity 15 to form a molded part 16.

The molded part 16 is ejected from between the mold halves 11 and 12 using an ejector assembly 20. The ejector assembly 20 generally comprises ejector pins 21, mold ejector plate 22, extension bars 1, and press ejector plate 23. The press ejector plate 23 is hydraulically driven or advanced and retracted by a drive system not shown. The mold ejector plate 22 is positioned within an ejector plate cavity 28 in the moveable mold half 12, generally formed between a rear plate 29 and front plates 30 of the moveable mold half 12. The ejector pins 21 are secured to the mold ejector plate 22 and extend forward therefrom, through ejector pin bores 32 in the movable mold half 12.

Each extension bar 1 is connected to the mold ejector plate 22 by a quick connection stud 35 and a quick connect coupler 36. The studs 35 are secured to the mold ejector plate 22 and extend rearward therefrom, through aligned bores 38 and 39 in the rear plate 29 of the movable mold half 12 and the movable platen 9 respectively. The quick connect couplers 36 are connected to a front end of each extension bar 1 as described in more detail below. The quick connect couplers 36 permit the extension bars to be quickly and remotely disconnected from the studs 35 and the mold ejector plate 22. The second end of each extension bar 1 is connected to the press ejector plate 23 which is supported between the movable platen 9 and the rear stationary platen 7.

FIG. 1 shows the mold 10 in a closed alignment for forming the molded part 16. After the molded part 16 is formed, the movable platen 9 is then advanced rearward to separate the stationary and movable mold halves 11 and 12. Referring to FIG. 2, the mold press 5 is shown wherein the movable platen 9 has advanced rearward to a point at which the mold halves 11 and 12 are considered fully open. At this point, the mold halves 11 and 12 are advanced sufficiently apart to permit the molded part 16 to fall from between the mold halves 11 and 12 when ejected from therebetween.

The press ejector plate 23 is then hydraulically advanced or driven forward, as generally shown in FIG. 3, to drive the mold ejector plate 22 forward relative to the ejector plate cavity 28 in the movable mold half 12. The ejector pins 21 are thereby advanced from a retracted position within the ejector pin bores 32 in the movable mold half 12 to an extended position relative thereto. As the ejector pins 21 are advanced to an extended position relative to the movable mold half 12 the ejector pins 21 separate the molded part 16 from the movable mold half 12 and the molded part 16 then falls by gravity from between the mold halves 11 and 12.

After the molded part 16 has been ejected from between the mold halves 11 and 12, the press ejector plate 23 is hydraulically retracted to return the ejector pins 21 to a retracted position relative to the movable mold half 12. The movable platen 9 is then advanced forward to close the mold 10 and the cycle is repeated. Once a run for a particular molded part is completed, the extension bars 1 are disconnected from the mold ejector plate 22 and the stationary and movable mold halves 11 and 12 are disconnected from and removed from the front stationary and movable platens 6 and 9 respectively. New mold halves 11 and 12 are then connected to the platens 6 and 9 and the extension bars 1 are then connected to the mold ejector plate 22 in the new movable mold half 12. Variations in the shape of the parts to be molded by different molds 10 as well as wear on particular molds 10 over time, often requires the length of the ejector assembly 20 to be adjusted when the molds 10 are changed.

Adjustable Length Extension Bars

The extension bars 1, shown in detail in FIGS. 4–7, are length adjustable to facilitate the necessary changes in length of the ejector assembly 20. Each extension bar 1 comprises a threaded rod or stud 40 with a rotatable member 41 threadingly secured thereto, a locking sleeve 42 slidably mounted to the rotatable member 41 and a locking nut 43 secured to the threaded rod 40. The threaded rod 40 is preferably hollow having a first airflow passageway 46 extending therethrough. An air supply fitting 47 is connected to a first end 48 of each threaded rod 40 and the rotatable member 41 is secured to a second end 49 of the threaded rod 40. Each air supply fitting 47 is connected to a source of pressurized air 50, shown schematically in FIGS. 1–3.

The threaded rod 40, of each extension bar 1, is connected, proximate its first end 48 to the press ejector plate 23. The threaded rod 40, extends through a bore 55 in the press ejector plate 23 and is secured in position by a nut 56 threadingly secured on the threaded rod 40 against a rear face of the press ejector plate 23 and the locking nut 43 threadingly secured on the threaded rod 40 against a front face of the press ejector plate 23. A washer 57 may be positioned between the nut 56 and the rear face of the press ejector plate 23.

The locking nut 43 generally comprises a hex head 60, a nipple 61 extending forward of the hex head 60 and four interlocking members or bosses 62 extending radially outward from the nipple 61. The nipple 61 is generally machined to be of reduced diameter relative to the hex head 60. The interlocking members 62 extend outward from the nipple 61 in equally spaced relation or ninety degrees apart. A forward facing end 63 of each interlocking member 62 is curved. The interlocking members 62 are adapted to engage cooperating structure on the locking sleeve 42 as will be described in more detail below.

The rotatable member 41 includes a head 66 and a shaft is 67 having a reduced outer diameter relative to the head 66. A bore or second air flow passageway 68 extends axially through the rotatable member 41. The bore 68 includes a first threaded section 69 and a second threaded section 70. The first threaded section 69 extends into the shaft 67 from a first end of the rotatable member 41 and the second threaded section 70 extends into the head 66 from a second end of the rotatable member 41. An intermediate section 73 connects the first and second threaded sections 69 and 70 of the bore 68. Wrench flats 74 are formed in the head 66 to facilitate use of a wrench to secure the head 66 to a threaded member such as a threaded stud of a quick connect coupler 36 (see FIG. 9) or a threaded stud extending directly from the mold ejector plate 22.

The locking sleeve 42 is slidably mounted on the shaft 67 of the rotatable member 41 between the head 66 of the rotatable member 41 and the locking nut 43. A compression spring 78 is positioned on the shaft 67 between the head 66 of the rotatable member 41 and the locking sleeve 42. One end of the spring 78 abuts a rear edge or shoulder 79 of the head 66 and an opposite end of the spring 78 abuts a front edge of the locking sleeve 42. The spring 78 biases or urges the locking sleeve 42 rearward toward the locking nut 43.

The locking sleeve 42 is prevented from rotating relative to the rotatable member shaft 67 by dowel 80 which extends through opposed elongated slots 81 in the sleeve 42 and through a bore 83 extending through the rotatable member shaft 67, transverse to a longitudinal axis of the shaft 67. The dowel 80 is press fit within the bore 83 to secure the dowel 80 to the shaft 67. The ends of the dowel 80 abut opposed edges 85 of the sleeve 42 which define the slots 81, thereby preventing rotation of the sleeve 42 relative to the shaft 67. Rotation of the sleeve 42 thereby causes rotation of the rotatable member 41 relative to the threaded rod 40 to adjust the length of the extension bar 1.

A plurality of notches 88 are formed in a rear end of the locking sleeve 42. The notches 88 extend around the sleeve 42 in equally spaced relation and in a preferred embodiment there are twelve notches 88. An interlocking finger 90 extends between each set of adjacent notches 88. The notches 88 are sized to receive the bosses or interlocking members 62 on the locking nut 43. The fingers 90 with the notches 88 extending therebetween may also be referred to as interlocking members.

The spring 78 normally biases the locking sleeve 42 rearward into engagement with the locking nut 43 such that the bosses 62 on the locking nut extend into aligned notches 88 on the locking sleeve 42. Abutment of the bosses 62 of the locking nut 43 against the fingers 90 on the locking sleeve 42 prevents rotation of the locking sleeve 42 and therefore the rotatable member 41 relative to the locking nut 43 and the threaded rod 40.

Once the extension bars 1 are connected between the mold ejector plate 22 and the press ejector plate 23, the length of each extension bar can be adjusted to adust the overall length of the ejector assembly 20. As discussed previously, an operator adjusts the length of an extension bar 1 by grasping the locking sleeve 42, sliding the locking sleeve 42 forward against the biasing force of the spring 78 and then rotating the locking sleeve 42 and the connected rotatable member 41 relative to the threaded rod 40. In a preferred embodiment, clockwise rotation of the locking sleeve 42 increases the length of the extension bar 1 and counterclockwise rotation of the locking sleeve 42 decreases its length.

The length of the extension bars 1 are adjusted until the tips of the ejector pins 21 extend flush with the portion of the mold cavity 15 formed in the movable mold half 12. Once the desired length is obtained, the locking sleeve 42 for the associated extension bar 1 is released. The spring 78 then biases the locking sleeve 42 back into engagement with the locking nut 43 to fix the rotational position of the locking sleeve 42 and rotatable member 41 relative to the locking nut 43 and threaded rod 40 to fix the length of the extension bar 1.

Quick Connect Coupler

The quick connect coupler 36, shown in detail in FIGS. 8–11, is adapted to facilitate connection of an extension bar 1 to the mold ejector plate 22 by releasably engaging a stud 35 bolted to the mold ejector plate 22. Although the quick connect coupler 36 and associated stud 35 are shown in use for connecting an extension bar to a mold ejector plate, it is foreseen that the quick connect coupler 36 and stud 35 could be used in a wide variety of applications in which quick connection between two elements and remote release of such a connection are desirable.

The stud or male coupling member 35 includes a hex body 101, a threaded stud 102 extending outward from one end of the hex body 101, and a stud head 103 extending outward from an opposite end of the hex body 101. An annular groove 104 is formed between the stud head 103 and the hex body 101, and the end of the stud head 103 is beveled. The male coupling member 35 is bolted to the mold ejector plate 22 (or other structure with which it is to be used) using threaded stud 102 such that the head 103 projects rearwardly from the mold ejector plate 22.

The quick connect coupler 36 comprises a female coupler body 110, an outer locking sleeve 111, balls 112, plunger or piston 113, spring 114, inner blocking sleeve 115 and roll pin or connecting pin 116. The female coupler body 110 comprises a hex body portion 120, a tubular stud receiver 121 extending forward from the hex body portion 120 and a threaded stud 122 extending rearward from the hex body portion 120. The quick connect coupler 36 is adapted to be connected or bolted to an extension bar 1 (or other structure with which it is to be used) by threading the threaded stud 122 of the female coupler body 110 into the second threaded section 70 in the head 66 of the extension bar rotatable member 41. The hex body portion 120 of the female coupler body 110 is adapted for engagement by a wrench to facilitate bolting of the quick connect coupler 36 to the extension bar 1.

A stud receiving bore or socket 125 is formed in the female coupler body 110 and extends inward from a front end thereof through the tubular stud receiver 121 and into the center portion 120 of the female coupler body 110. A bore or air flow passageway 128 extends through the threaded stud 122 of the female coupler body 110 and connects to the stud receiving bore 125.

A plurality of ball receiving holes 130 are formed in the tubular stud receiver 121 of the female coupler body 110 and extend radially outward therefrom in equally spaced relation. The balls 112 are positioned within the holes 130. A preferred embodiment incorporates four balls 112 and four holes 130. The holes 130 are of slightly greater diameter than the diameter of the balls 112 except along an inner edge of the holes 130 along which an annular rim 131 is formed. The inner diameter of the annular rim 131 is slightly smaller than the diameter of the balls 112 to prevent the balls 112 from sliding completely therethrough into the socket 125. A pair of first pin guide slots 133, for receiving the roll pin 116, are formed in the female coupler body 110 rearward of the ball receiving holes 130. As described in more detail below, the roll pin 116, extending through the first pin guide slots 133, connects the outer locking sleeve 111 to the piston 113.

The piston 113 and the inner blocking sleeve 115 are slidably mounted within the socket 125 of the female connector body 110. The piston 113 includes a piston head 135 and a piston shaft 136 extending forward from the piston head 135. An O-ring 138 is mounted in an annular groove 139 of the piston head 135 to form an airtight seal between the piston head 135 and the female connector body 110. The piston shaft 136 is of reduced diameter relative to the piston head 135. A bore 140 is formed in the front end of the piston shaft 136 and sized to receive the roll pin 116.

The inner blocking sleeve 115 is slidably mounted within the socket 125 on the piston shaft 136. The front end of the inner blocking sleeve 115 is beveled inward to form a chamfer 142. The spring 114 is positioned on the piston shaft 136 and extends between and abuts the piston head 135 and a rear end of the inner blocking sleeve 115.

A pair of second pin guide slots 143 are formed in the inner blocking sleeve on opposite sides thereof. The first and second pin guide slots 133 and 143 generally extend in axial alignment parallel to the longitudinal axis of the quick connect coupler 36. The roll pin 116 extends through the bore 140 in the piston shaft 136, through the second pin guide slots 143 in the inner blocking sleeve 115, through the first pin guide slots 133 in the female connector body 110 and into aligned pin receiving bores 145 in the outer locking sleeve 111. The roll pin 116 is press fit into the pin receiving bores 145 in the outer locking sleeve 111 to securely connect the roll pin 116 thereto and secure the outer locking sleeve 111, the inner blocking sleeve 115 and the piston 113 together.

The outer locking sleeve 111 is slidably mounted on the tubular stud receiver 121 of the female coupler body 110. An annular groove or recess 150 is formed on an inner surface of the outer locking sleeve 111. The annular recess 150 is spaced inward from a front end of the outer locking sleeve 111 and includes front and rear beveled edges 151 and 152. The front beveled edge 151 may also be referred to as a front cam surface.

The annular recess 150 is positioned on the outer locking sleeve 111 to be selectively advanceable into and out of alignment with the ball receiving holes 130 in the female coupler body 110. The outer locking sleeve 111 moves with the piston 113, and the abutment of the roll pin 116 against the ends of the first pin guide slot 133 limits the range of motion of the piston 113 and the outer locking sleeve 111. When the piston 113 and the outer locking sleeve 111 are advanced to their forwardmost alignment or position, the annular recess 150 is aligned with the ball receiving holes 130 in the female connector body 110. When the piston 113 and the outer locking sleeve 111 are advanced to their rearward most alignment or position, an inner surface 154 of the front end of the outer locking sleeve 111 extends generally flush across the ball receiving holes 130.

As will be described in more detail below, the piston 113 and the outer locking sleeve 111 are driven to the forwardmost position by supplying pressurized air through bore 128 in the threaded stud 122 of the coupler 36 to act against the piston head 135 and drive the piston 113 forward. The pressurized air is supplied to the quick connect coupler 36 through the aligned first and second airflow passageways 46 and 68 in the extension bar 1 which are in turn flow connected to the source of pressurized air 50.

Figure 8:
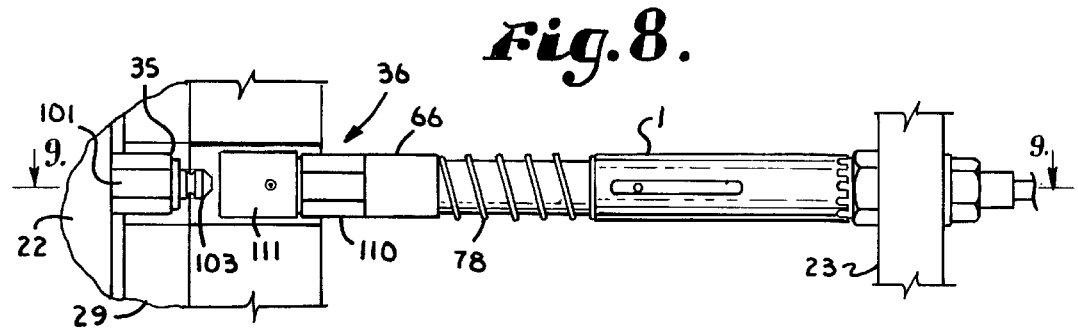
FIG. 8 is an exploded elevational view of a quick connect coupler assembly comprising a quick connect coupler and a quick connect stud for connecting an extension bar to a mold ejector plate.
Figure 9:
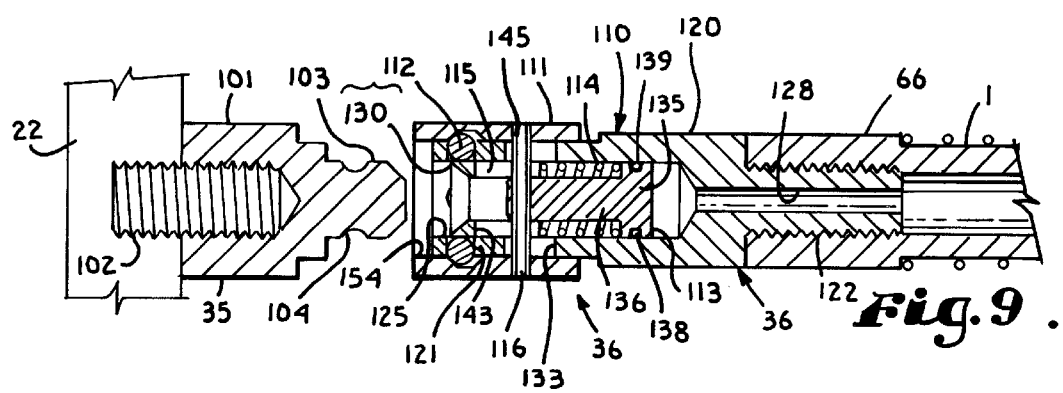
FIG. 9 is a cross sectional view taken generally along line 9—9 of FIG. 8 showing the quick connect coupler disconnected from said quick connect stud.

Referring to FIG. 9, the quick connect coupler 36 is shown disconnected from the stud 35 without pressurized air supplied to the quick connect coupler 36. The outer locking sleeve 111 is held in an extended alignment by the balls 112 acting on the front cam surface 151 of the annular recess 150 in the outer locking sleeve 111. The balls 112 are held or maintained in a radially extended alignment, extending into the annular recess 150 in the outer locking sleeve 111, by the inner blocking sleeve 115 which extends at least partially across the ball receiving holes 130 in the female connector body 110. The alignment of the quick connect coupler 36 as shown in FIG. 8 may generally be referred to as a set alignment.

Figure 10:
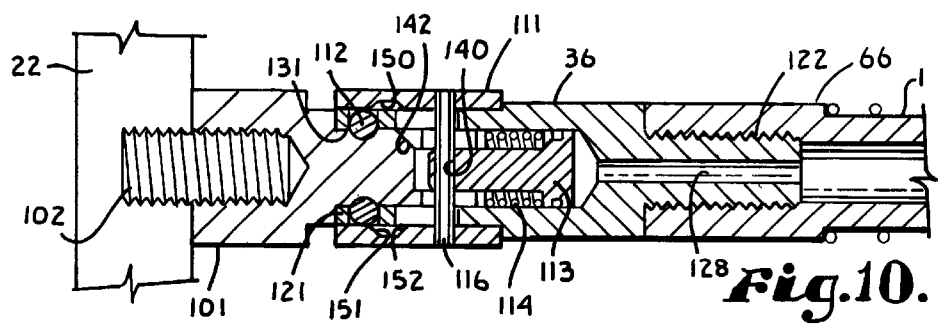
FIG. 10 is a cross sectional view similar to FIG. 9 showing the quick connect coupler extending over and engaging the quick connect stud.

In connecting the quick connect coupler 36 in the set alignment to the stud 35, as the coupler 36 is advanced over the stud 35, the stud 35 abuts the front end of the inner blocking sleeve 115. Further advancement of the coupler 36 over the stud 35 pushes the inner blocking sleeve 115 rearward, compressing the spring 114 between the inner blocking sleeve 115 and the piston head 135. The balls 112 are held in the radially extended position and thereby prevent rearward advancement of the outer locking sleeve 111 and the piston 113 until the head 103 of the stud 35 is advanced far enough into the socket 125 that the annular groove 104 in the stud 35 is brought into alignment with the ball receiving holes 130 in the female coupler body 110. As the annular groove 104 in the stud head 103 is brought into alignment with the ball receiving holes 130 in the female coupler body 110, the rearwardly directed force exerted on the outer locking sleeve 111 by the spring 114 acting on the piston head 135, drives the balls 112 out of the annular recess 150 in the outer locking sleeve 111, through the ball receiving holes 130 and into the annular groove 104 in the stud head 103. Once the balls 112 have been advanced out of engagement with the cam surface 151 of the annular recess 150 in outer locking sleeve 111 and into the annular groove 104 in the stud head 103, the spring 114 biases the piston 113 and the outer locking sleeve 111 further rearward. As the outer locking sleeve 111 is advanced further rearward, the inner surface 154 of the outer locking sleeve 111 in front of the annular recess 150 extends across the ball receiving holes 130 in the female connector body 110, as generally shown in FIG. 10, preventing the balls 112 from expanding outward out of engagement with the stud head 103. The position of the outer locking sleeve 111, as shown in FIG. 10, may be described as a retracted or locking position. Advancement of the locking sleeve 111 to the locking position, holds the balls 112 in engaging relationship with the stud head 103, and positively locks the quick connect coupler 36 to the stud 35.

Figure 11:
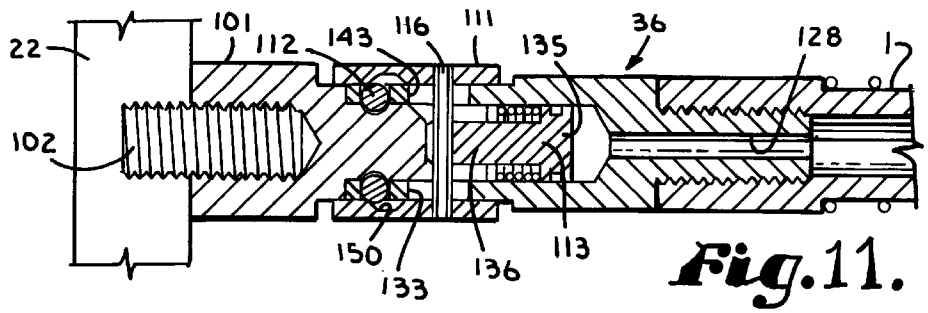
FIG. 11 is a cross sectional view similar to FIG. 10 showing the quick connect coupler extending over but released from the quick connect stud.

The outer locking sleeve 111 may be remotely advanced to an extended or unlocked position, as shown in FIG. 11, by supplying pressurized air to the piston head 135 through the air supply passageway 128 in the female coupler body 110. The pressurized air drives the piston 113 and the outer locking sleeve 111 forward, against the biasing force of the spring 114, until the annular recess 150 in the outer locking sleeve 111 is aligned with the ball receiving holes 130 in the female connector body 110. Abutment of the inner blocking sleeve 115 against the stud head 103, prevents the inner blocking sleeve 115 from sliding forward as the piston 113 is driven forward. The piston shaft 136 slides forward within the inner blocking sleeve 115 and the spring 114 is compressed between the piston head 135 and the inner blocking sleeve 115 as the piston 113 is driven forward.

With the annular recess 150 of the outer locking sleeve 111 aligned with the ball receiving holes 130 in the female connector body 110, the quick connect coupler 36 can be separated from the stud 35. As the quick connect coupler 36 is separated from the stud 35, the sloped surface of the annular groove 104 in the stud head 103 drives the balls 112 outward through the ball receiving holes 130 and into annular recess 150 in the outer locking sleeve 111. In addition, as the quick connect coupler 36 is pulled away from the stud 35, the spring 114 biases inner blocking sleeve 115 forward to follow the stud 35 as it is withdrawn from the socket 125.

The inner blocking sleeve 115 slides forward with the stud 35 as it is being withdrawn until the inner blocking sleeve 115 extends at least far enough across the ball receiving openings 130 to prevent the balls 112 from advancing into the socket 125 of the female coupler body 110. The inner blocking sleeve 115 is restrained from further forward advancement within the socket 125 by abutment of the rear end of the second pin guide slot 143 in the inner blocking sleeve 115 against the roll pin 116.

Once the stud 35 is withdrawn from the quick connect coupler 36, the quick connect coupler 36 has returned to the set position. Advancement of the inner blocking sleeve 115 across the ball receiving holes 130 maintains the balls 112 in abutting relationship with the front cam surface 151 of the outer locking sleeve 111. Therefore, even if the pressurized air in the air flow passageway 128 is vented to atmosphere the piston 113 and the outer locking sleeve 111 are restrained from returning to a retracted position, until the inner blocking sleeve 115 is advanced away from the ball receiving holes 130. The inner blocking sleeve 115 is thereby adapted to prevent damage to the coupler 36 by holding the balls 112 out of stud receiving bore 125 and preventing the outer locking sleeve 111 from returning to the locked position until the inner blocking sleeve 115 is advanced away from the ball receiving holes 130 when compressed rearward by advancement of the stud 35 against the inner blocking sleeve 115.

It is to be understood that while certain forms of the present invention have been illustrated and described herein, it is not to be limited to the specific forms or arrangement of parts described and shown. For example, although the coupler assembly is described as using pressurized air to act on the piston head 135 to disengage the coupler 36, it is foreseen that any suitable pressurized fluid including air could be used.

What is claimed and desired to be secured by Letters Patent is as follows:

1. An apparatus comprising an extension bar for connecting a mold ejector plate to a press ejector plate, said extension bar comprising:
   a) a threaded stud connectable proximate a first end to a first of said press ejector plate and said mold ejector plate and having a second end extending outward therefrom;
   b) a rotatable member having a head and a shaft with a first threaded bore extending into said shaft; said head connectable to a second of said press ejector plate and said mold ejector plate; said rotatable member threadingly secured to said second end of said threaded stud;

c) a locking sleeve slidably mounted on said rotatable member shaft such that said locking sleeve is slidable axially relative to said shaft but is not rotatable about said shaft; said locking sleeve having a first interlocking member formed on a first end of said locking sleeve;

d) a second interlocking member secured to said threaded stud between said rotatable member and said first end of said threaded stud; and e) a spring secured to said rotatable member shaft and engaging said locking sleeve to biasingly urge said locking sleeve toward said second interlocking member to urge said first and second interlocking members into interlocking engagement to prevent rotation of said rotatable member relative to said second interlocking member; said sleeve and said rotatable member being rotatable relative to said threaded stud to adjust the length of said extension bar upon sliding of said slidable member away from said second interlocking member such that said first and second interlocking members are advanced out of interlocking engagement.

2. The apparatus as in claim 1 wherein:

a) an airflow passageway extends axially through said threaded stud and said rotatable member.

3. The apparatus as in claim 2 wherein:

a) said head of said rotatable member is connected to a quick connect coupler that releasably engages a quick connection stud on said second of said press ejector plate and said mold ejector plate; said quick connect coupler releasing said quick connection stud when pressurized air is supplied to said quick connect coupler through said airflow passageway in said threaded stud and said rotatable member of said apparatus.

4. The apparatus as in claim 1 wherein:

a) said second interlocking member comprises a locking nut threadingly secured to said threaded stud and having a plurality of bosses extending radially outward therefrom in radially spaced relationship; and b) said first interlocking member comprises a plurality of notches extending between fingers formed on said first end of said locking sleeve; said notches sized to receive said bosses when said locking sleeve is biased against said locking nut.

5. The apparatus as in claim 4 wherein said second interlocking member comprises four bosses extending radially outward from said locking nut in equally spaced relationship and said first interlocking member includes at least eight notches.

6. An apparatus comprising an extension bar for connecting a mold ejector plate to a press ejector plate, said extension bar comprising:

a) a threaded stud connected proximate a first end to said press ejector plate and having a second end extending toward said mold ejector plate;

b) a rotatable member having a head and a shaft with a first threaded bore extending into said shaft; said rotatable member threadingly secured to said second end of said threaded stud;

c) a locking sleeve slidably mounted on said rotatable member shaft such that said locking sleeve is slidable axially relative to said shaft but is not rotatable about said shaft; said locking sleeve having a first interlocking member formed on a first end of said locking sleeve facing said press ejector plate;

d) a locking nut threadingly secured to said threaded stud between said rotatable member and said press ejector plate and having a second interlocking member formed on said locking nut; and e) a spring secured to said rotatable member shaft and engaging said locking sleeve to biasingly urge said locking sleeve toward said locking nut to advance said first and second interlocking members into interlocking engagement to prevent rotation of said rotatable member relative to said locking nut; said sleeve and said rotatable member being rotatable relative to said threaded stud to adjust the length of said apparatus upon sliding of said slidable member away from said locking nut such that said first and second interlocking members are advanced out of interlocking engagement.

7. The apparatus as in claim 6 wherein:

a) an airflow passageway extends axially through said threaded stud and said rotatable member.

8. The apparatus as in claim 7 wherein:

a) said head of said rotatable member is connected to a quick connect coupler that releasably engages a quick connection stud on said mold ejector plate; said quick connect coupler releasing said quick connection stud when pressurized air is supplied to said quick connect coupler through said airflow passageway in said threaded stud and said rotatable member of said extension bar.

9. The apparatus as in claim 6 wherein:

a) said second interlocking member on said locking nut comprises a plurality of bosses extending radially outward therefrom in radially spaced relationship; and b) said first interlocking member comprises a plurality of notches extending between fingers formed on said first end of said locking sleeve; said notches sized to receive said bosses when said locking sleeve is biased against said locking nut.

10. The apparatus as in claim 9 wherein said second interlocking member comprises four bosses extending radially outward from said locking nut in equally spaced relationship and said first interlocking member comprises at least eight notches.

* * * * *